United States Patent
Kinghorn (10) Patent No.: US 7,106,242 B2
(45) Date of Patent: Sep. 12, 2006

(54) HIGH RANGE RESOLUTION RADAR SYSTEM

(75) Inventor: Anthony Miles Kinghorn, Edinburgh (GB)

(73) Assignee: BAE Systems plc., London (GB)

( * ) Notice: Subject to any disclaimer, the term of this patent is extended or adjusted under 35 U.S.C. 154(b) by 6 days.

(21) Appl. No.: 10/518,240

(22) PCT Filed: Jun. 27, 2003

(86) PCT No.: PCT/GB03/02746

§ 371 (c)(1),
(2), (4) Date: Dec. 16, 2004

(87) PCT Pub. No.: WO2004/005961

PCT Pub. Date: Jan. 15, 2004

(65) Prior Publication Data

US 2006/0061505 A1    Mar. 23, 2006

(30) Foreign Application Priority Data

Jul. 9, 2002   (GB) ................................ 0215967.1

(51) Int. Cl.
*G01S 13/90* (2006.01)
*G01S 13/08* (2006.01)

(52) U.S. Cl. ................. 342/25 A; 342/25 E; 342/25 F; 342/118; 342/135

(58) Field of Classification Search ............... 342/25 R, 342/25 A, 25 E, 25 F, 118, 128–137, 159–162, 342/192–196, 200–204
See application file for complete search history.

(56) References Cited

U.S. PATENT DOCUMENTS 3,594,795 A * 7/1971 Thor et al. .................. 342/201

(Continued)

FOREIGN PATENT DOCUMENTS

EP          0 291 337 A     11/1988

(Continued)

OTHER PUBLICATIONS

"Improved wideband time delay beam-steering", Conference Record of Thirty-Fifth Asilomar Conference on Signals, Systems and Computers 2001, vol. 2, p. 1385-90 vol. 2, Rabideau-D-J.*

(Continued)

*Primary Examiner*—John B. Sotomayor
(74) *Attorney, Agent, or Firm*—Crowell & Moring LLP (57) ABSTRACT

Described herein is a method and apparatus for improving high range resolution of a radar system. The method comprises phase shifting a radar pulse to be transmitted at substantially the radar transmission frequency and phase shifting the received radar pulse at substantially the radar transmission frequency. The phase shifting is implemented using a monolithic microwave integrated circuit (MMIC) (42) driven by a digital circuit (44) to provide a phase profile which is applied to radar pulse (52) produced by a radar pulse generator (54) and which is also applied to a received radar pulse (60). A master clock and synchronizer (72) provides clock signals for an analogue to digital converter (ADC) (68), the generator (54) and the digital circuit (44) so that the MMIC (42) is clocked at a frequency which is directly harmonically related to the ADC (68). This avoids spurious beat frequencies which could interfere with a wanted radar signal.

20 Claims, 6 Drawing Sheets

U.S. PATENT DOCUMENTS

| | | |
|---|---|---|
| 3,648,177 A | 3/1972 | Himmel |
| 4,237,461 A | 12/1980 | Cantrell et al. |
| 4,370,652 A * | 1/1983 | Lucchi .................. 342/101 |
| 4,709,237 A | 11/1987 | Poullain et al. |
| 5,719,580 A | 2/1998 | Core |
| 6,211,812 B1 | 4/2001 | Chiles et al. |
| 6,222,933 B1 * | 4/2001 | Mittermayer et al. ....... 382/109 |
| 6,225,943 B1 * | 5/2001 | Curley et al. ............... 342/137 |
| 6,587,072 B1 * | 7/2003 | Gresham et al. .............. 342/70 |
| 6,879,281 B1 * | 4/2005 | Gresham et al. .............. 342/70 |
| 2002/0075178 A1 | 6/2002 | Woodington et al. |
| 2003/0193430 A1 * | 10/2003 | Gresham et al. .............. 342/70 |
| 2006/0061505 A1 * | 3/2006 | Kinghorn .................. 342/25 A |

FOREIGN PATENT DOCUMENTS

| | | |
|---|---|---|
| GB | 1 587 357 A | 4/1981 |

OTHER PUBLICATIONS

Cohen, M.N.: "An overview of high range resolution radar techniques"—Proceedings of the National Telesystem Conference. Atlanta, Mar. 26-27, 1991, New York, IEEE, US, vol. 1, Mar. 26, 1991, pp. 107-115, XP010047012, ISBN: 0-7803-0062-9 (The whole document).

* cited by examiner

HIGH RANGE RESOLUTION RADAR SYSTEM

The present invention relates to improvements in or relating to range resolution, and is more particularly concerned with obtaining high range resolution for a radar system for example.

In order to obtain high range resolution, a radar must transmit and process a wide bandwidth waveform. For example, to obtain a range resolution of 1 m, a nominal bandwidth of 150 MHz (in practice somewhat more) must be used.

Conventional radar receivers operate with much narrower bandwidths, typically in the range 1~10 MHz. Whilst specialised wideband receivers can be used, they are relatively difficult to implement and are costly, especially in multifunction radar.

A more efficient method of obtaining high range resolution is known as 'stretch radar' or deramp processing. The conventional approach is to use a voltage controlled oscillator to provide the frequency modulated signals on transmit and receive. On receive, the signal feeds the receiver's local oscillator.

A wideband pulse is transmitted where the carrier frequency is ramped linearly over the pulse duration, the total frequency excursion being the transmitted bandwidth. At the expected time of reception from a distant target, the radar receiver's local oscillator is ramped at the same rate. This has the result that the downconverted signal is at zero frequency if the deramp is precisely synchronised with the received pulse, or has a small (constant) frequency offset if the pulse is not precisely aligned. This frequency offset may be extracted by Fourier analysis of the received pulse. With this method a much finer range resolution is achieved than would otherwise be possible with a narrowband receiver, provided the parameters are chosen appropriately. However, this method only works over a limited range swathe which is effectively delimited at one end by the start of the deramp, and at the other by the point at which the frequency offset signal goes outside the bandwidth of the narrowband receiver. This limitation is rarely a problem in practice, as high resolution radars are normally only interested in small regions.

Whilst the method described above is based on frequency modulation and employs variable frequency oscillators, its implementation is relatively complex and suffers from the disadvantage that the circuits employed suffer from drift and other errors or requires complex calibrations if direct digital synthesis is utilised.

It is therefore an object of the present invention to provide a method of obtaining high range resolution which overcomes the problems described above.

In accordance with one aspect of the present invention, there is provided a method of obtaining high range resolution in a radar system, the method comprising the steps of:

a) generating a radar pulse;
b) modulating the radar pulse;
c) transmitting the modulated radar pulse;
d) receiving a radar pulse;
e) modulating the received radar pulse; and
f) processing the modulated radar pulse to obtain range information;

characterised is that step b) comprises applying a time-dependent phase shift, changed at discrete time intervals, to the radar pulse at substantially the radar transmission frequency, and step e) comprises applying a time-dependent phase shift, changed at discrete time intervals, to the received radar pulse at substantially the radar transmission frequency;

and in that step f) comprises sampling the received signal at discrete time intervals which are an integral number of the time intervals of the time-dependent phase shift.

By the term "at substantially the radar transmission frequency" is intended to mean that the phase shift applied is substantially at the transmission frequency. For example, if the radar transmission frequency is 10 GHz, the radar pulse is at 1 GHz, then the phase shift is applied at a frequency of 9 GHz which is substantially the same as the transmission frequency.

The time-dependent phase shift may comprise a synthesised sequence or an arbitrary sequence.

Ideally, the time-dependent phase shift produces a predetermined phase profile and it is preferred that such a phase profile comprises a quadratic phase profile.

In accordance with the second aspect of present invention, there is provided a radar system comprising:

means for generating a radar pulse;
means for modulating the radar pulse;
means for transmitting the radar pulse;
means for receiving a reflected radar pulse;
means for modulating the received radar pulse; and
means for processing the modulated received radar pulse to obtain range information;

characterised in that the means for modulating the radar pulse includes a phase shifter which applies a time-dependent phase shift, which is changed at discrete time intervals, at substantially the radar transmission frequency, and the means for modulating the received radar pulse includes a phase shifter which applies a time-dependent phase shift, which is changed at discrete intervals, at substantially the radar transmission frequency;

and in that the means for processing the modulated received radar pulse includes sampling means for sampling the received signal at discrete time intervals which are an integral number of the time intervals of the time-dependent phase shift.

Each phase shifter may be driven in accordance with a synthesised sequence which may be implemented by a plurality of discrete logic components or by a field programmable gate array.

Alternatively, each phase shifter may be driven in accordance with an arbitrary sequence provided by a memory device.

If is preferred that the means for modulating the radar pulse includes a local oscillator and first mixing means, the local oscillator providing a signal for mixing with the radar pulse in the first mixing means. The local oscillator signal may be phase shifted prior to mixing with the radar pulse. Alternatively, the local oscillator signal may be mixed with the radar pulse prior to being phase shifted.

Similarly, it is preferred that the means for modulating the received radar pulse includes a local oscillator and a second mixing means, the local oscillator providing a signal for mixing with the received radar pulse in the second mixing means. The local oscillator signal may be phase shifted prior to mixing with the received radar pulse. Alternatively, the received radar pulse may be phase shifted prior to mixing with the local oscillator signal.

In one embodiment of the present invention, a single local oscillator is utilised which provides a local oscillator signal to both the radar pulse and the received radar pulse. In this embodiment a single phase shifter is located in the local oscillator signal path and the same phase shifted signal is utilised for modulation of both the radar pulse and the received radar pulse, the modulation being applied at different times.

Ideally, each phase shifter comprises a digital phase shifter, for example, a monolithic microwave integrated circuit.

For a better understanding of the present invention, reference will now be made, by way of example only, to the accompanying drawings in which.

As background, stretch radar decoding is described. For a narrow range swathe, such as is mapped by a synthetic aperture radar, linear frequency modulation is commonly decoded by a technique called stretch radar. As the return from the swathe is received, its frequency is subtracted from a reference frequency that increases at the same rate as the transmitter frequency. The reference frequency increases continuously throughout the entire period in which the return from the swathe is received. Consequently, the difference between the reference frequency and the frequency of the return from any one point on the ground is constant. If the initial offset, $f_0$, of the reference frequency is subtracted from the difference obtained, the result is proportional to the range of the point from the near edge of the swathe. Range is thus converted to frequency.

By considering four closely spaced points after subtraction has been performed, four returns are received which, although received almost simultaneously, have slightly staggered arrival times. Due to the difference or stagger in arrival times discernible differences in frequency are obtained for each of the four returns. These differences in frequency can then be converted to range values. This is achieved by applying the output of a synchronous detector to a bank of narrowband filters implemented, for example, with a highly efficient fast Fourier transform.

Figure 1:
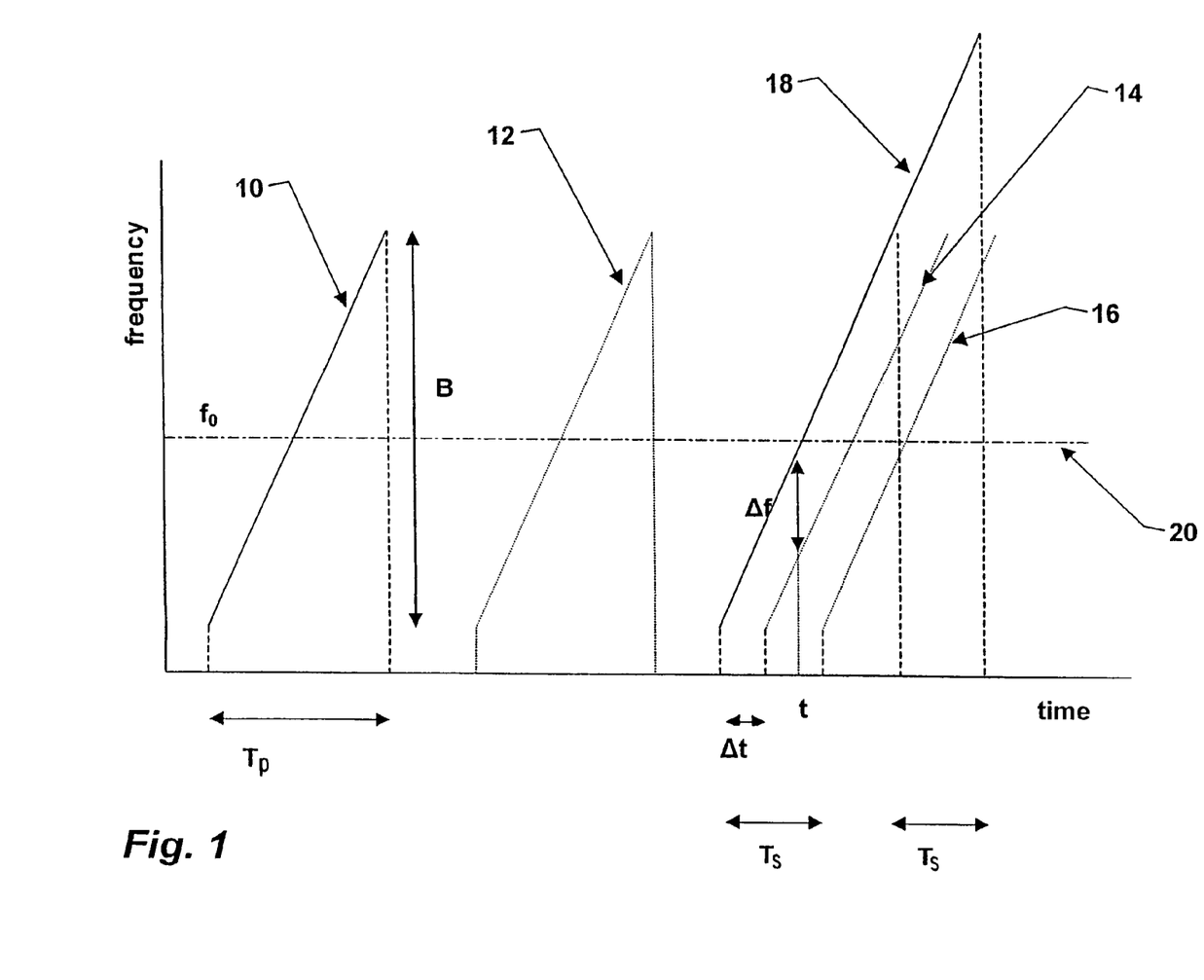
FIG. 1 illustrates a frequency-time diagram for stretch radar.

Turning now to FIG. 1, a transmitted pulse 10 is shown which has a total frequency excursion B and a transmitted pulse width $T_p$. The pulse at a 'target' 12 is also shown. Two received pulses 14, 16 are also shown relative to a reference pulse 18. The carrier frequency, $f_0$, is represented by chain line 20. As shown, at a point in time, the frequency difference between the reference pulse 18 and the first received pulse 14 is $\Delta f$ and for a given frequency, the time delay is $\Delta t$.

If the minimum target range to start of range swathe is $R_{min}$, it can be expressed as $$R_{min} = T_p \frac{c}{2}$$

where c is the speed of light.

For a transmitted pulse width of 100 μs, $R_{min}$ is 15 km.

If the range swathe is $R_s$, the time difference, $T_s$, between points on nearest and furthest boundaries of the swathe can be expressed as $$T_s = 2\frac{R_s}{c}$$

Therefore, the total time duration for the 'de-stretch' must be $T_p+T_s$. For example, if $R_s$ is 1 km, $T_s$ is 6.667 μs.

Range resolution, $R_r$, can be expressed as:

$$R_r = \left(F_r \frac{c}{2}\right)\left(\frac{T_p}{B}\right)$$

where $F_r$ is the minimum discernible frequency resolution.

Then, $$B = \left(F_r \frac{c}{2}\right)\left(\frac{T_p}{R_r}\right)$$

If, for example, $F_r$ is 10 kHz, $R_r$ is 1 m, $T_p$ is 100 μs, then B is 150 MHz, and the slope k of the frequency sweep is 1.5 MHz per μs $$\left(k = \frac{B}{T_p}\right).$$

A digital phase shifter is operated to sweep the frequency by ±B/2 about the carrier frequency, $f_0$, that is, the total frequency excursion B. However, to satisfy the Nyquist criterion, the clock rate of the digital phase shifter would have to be in excess of B. For example, if B is 200 MHz, the clock rate will need to be greater than 200 MHz.

If the 'de-stretch' is centred on the centre of the range swathe, then the intermediate frequency (IF) bandwidth is symmetrical about the IF centre frequency. The IF bandwidth, $B_{IF}$, can be expressed as being approximately $$B_{IF} = k\left(\frac{2R_s}{c}\right)$$

As an example, if k=1.5 MHz per μs, as in the example above, and $R_s$ is 1 km, the $B_{IF}$ is 1 MHz. If the 'de-stretch' commences at the start of the range swathe, then the IF bandwidth is to one side of the IF centre frequency.

Figure 2:
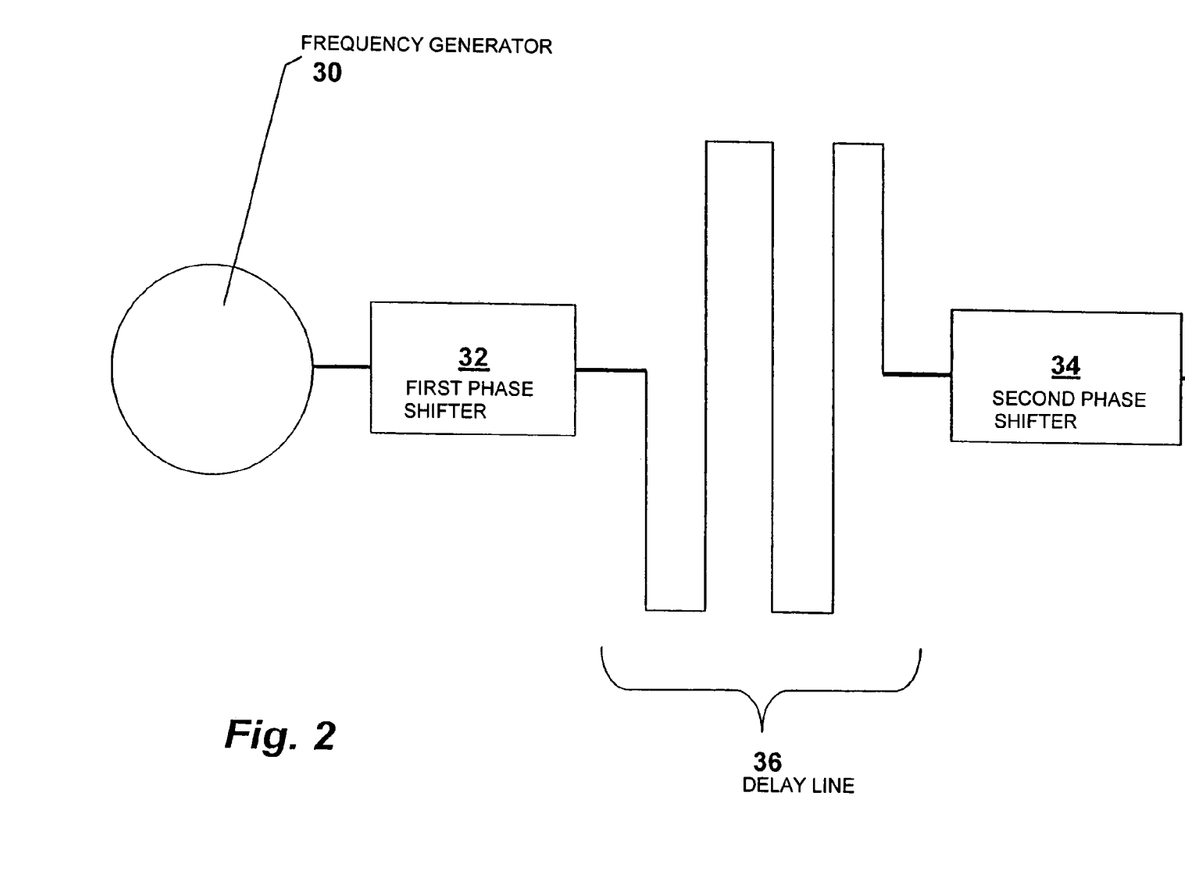
FIG. 2 illustrates a phase shifter operation.

Referring now to FIG. 2 for a description of phase shifter operation, a frequency generator 30 is shown connected to a first phase shifter 32. The frequency generator 30 provides an output signal cos($\omega_0 t$). The first phase shifter 32 is connected to a second phase shifter 34 via a delay line 36. The delay line 36 produces a delay, T, which represents the delay to point target within range swathe.

If the output, A(t), of the first phase shifter 32 is to have a frequency ω, where ω=$\omega_0$+2πkt that is, the linear frequency sweep of slope k, then $$A(t) = \cos\left(\omega_0 t + \frac{2\pi k t^2}{2}\right)$$

where the phase shift $$\theta_A(t) \text{ is } \frac{2\pi k t^2}{2}.$$

After the transmission delay, T, in delay line 36, $$A(t-T) = \cos\left(\omega_0[t-T] + \left(\frac{2\pi k[t-T]^2}{2}\right)\right)$$

The second phase shifter 34 has to be set to produce a phase shift, $\theta_B(t)$, of $$\theta_B(t) = \frac{-2\pi k(t-T_0)^2}{2}$$

which has the opposite characteristic to the first phase shifter 32, that is, the slope is negative instead of being positive. Time $T_0$ represents the time to the start or centre of the range swathe as appropriate.

The output, B(t), of the second phase shifter 34 is then $$B(t) = \cos\left(\omega_0[t-T] + \left(\frac{2\pi k[t-T]^2}{2}\right) - \left(\frac{2\pi k(t-T_0)^2}{2}\right)\right)$$
$$= \cos\left(\omega_0 t + \frac{2\pi k}{2}(T^2 - 2Tt - T_0^2 + 2T_0 t) - \omega_0 T\right)$$
$$= \cos\left([\omega_0 - 2\pi k(T-T_0)]t - \omega_0 T - \frac{2\pi k}{2}[T_0^2 - T^2]\right)$$

It will be appreciated that the above expression includes both a frequency or time dependent term and a static phase term, and the frequency offset, $\Delta f$, from the reference pulse 18 (FIG. 1) is $$\Delta f = -k(T-T_0)$$

In practice, both phase shifters 32, 34 will be digitally controlled devices having a finite number of phase states, usually $2^m$, and the control data will be clocked out once every $T_c$ seconds where $$T_c = \frac{1}{f_c}$$

where $f_c$ is the frequency at which the phase shifters are clocked.

The angular frequency, $\omega_p$, from a phase shifter is given by $$\omega_p = \frac{d\theta}{dt}$$

but $$d\theta = p\left(\frac{2\pi}{2^m}\right)$$

where $$p = 0, 1, 2, \ldots 2^m$$

and $$dt = qT_c$$

where $$q = 1, 2, 3, \ldots$$

Therefore, $$\omega_p = \frac{\left[p\left(\frac{2\pi}{2^m}\right)\right]}{qT_c} = \frac{2\pi p f_c}{q(2^m)}$$

To satisfy the Nyquist criteria, the highest frequency, $\omega_{pmax}$, which can be produced is $$\omega_{p\,max} = \pi f_c$$
$$f_{p\,max} = \frac{f_c}{2}$$

which means that $p = 2^{m-1}$ and $q = 1$.

Figure 3:
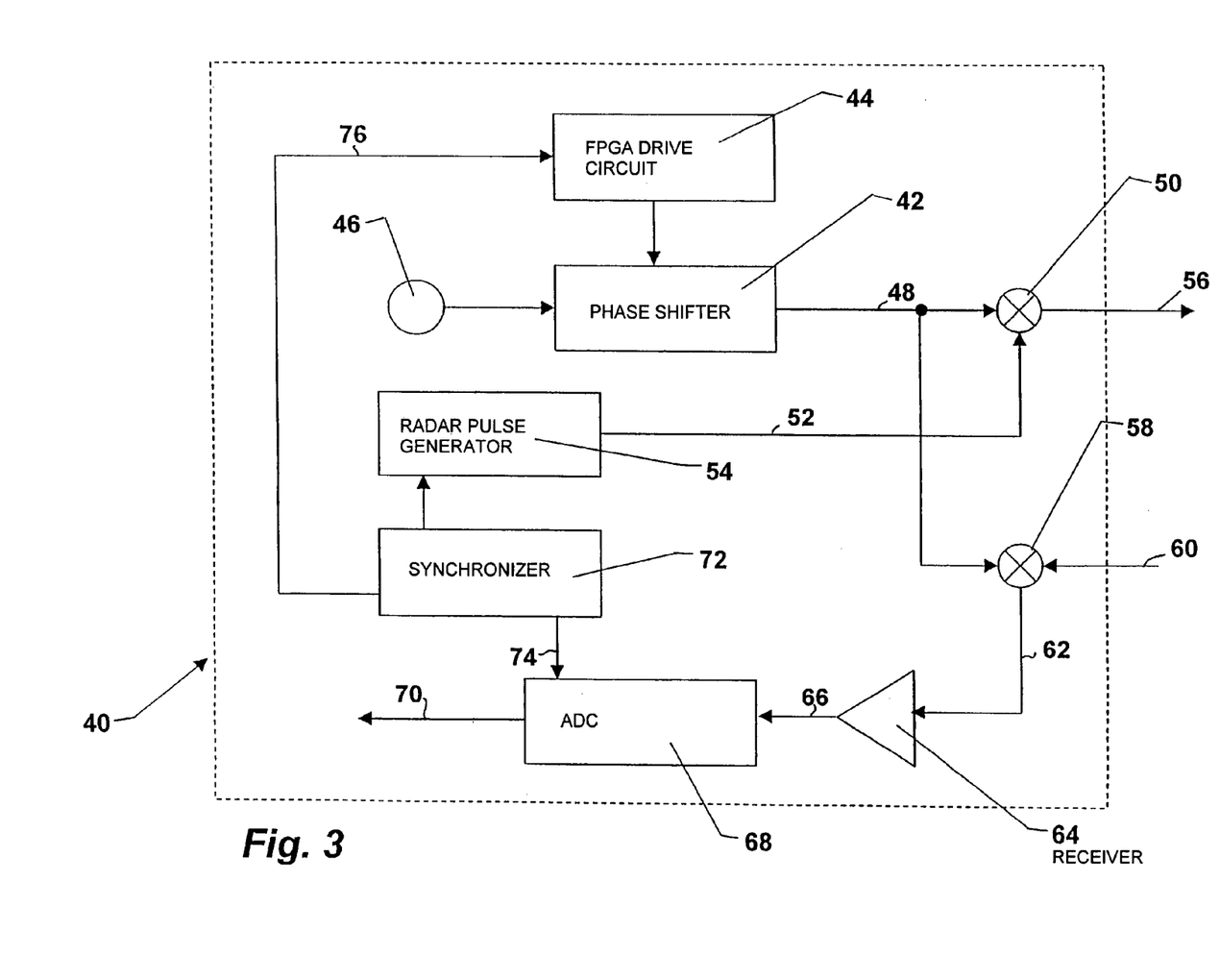
FIG. 3 illustrates a block diagram of a device for implementing stretch radar in accordance with the present invention.

Before describing FIG. 3, it is to be noted that frequency can be thought of in terms of phase shifting as frequency is simply a rate of change of phase. This is relevant to the operation of the device in FIG. 3. As a result of frequency being considered in terms of rate of change of phase, the linear frequency ramps required for stretch radar may be simple quadratic phase profiles.

Moreover, phase shifting devices operating directly at radio frequency (RF) may be realised in gallium arsenide monolithic microwave integrated circuits (GaAs MMICs).

Turning now to FIG. 3, a device 40 for implementing stretch radar is shown. The device 40 comprises a MMIC phase shifter 42 which is driven by a field programmable gate array (FPGA) drive circuit 44. The FPGA drive circuit 44 produces a synthesised sequence which drives the phase shifter 42. As an alternative to a FPGA drive circuit 44, the synthesised sequence can be implemented by discrete logic components. In another embodiment, the phase shifter 42 may be driven by an arbitrary sequence stored in a suitable memory device (not shown). The phase shifter 42 is connected to a radar RF reference oscillator 46 and provides a local oscillator (LO) output signal 48 which is passed to a mixer 50 where it is mixed with a pulse 52 from a radar pulse generator 54. The mixer 50 produces a phase shifted (upconverted) pulse 56 which is passed to a radar transmitter (not shown).

It is important that the phase shifter is applied to a signal which has a frequency which is substantially at the transmission frequency. For example, the radar pulse generator may generate a pulse at a frequency of around 1 GHz and the local oscillator signal is at a frequency of around 9 GHz, and when the pulse and the oscillator signals are mixed, a transmission frequency of around 10 GHz.

The LO output signal 48 is also passed to a mixer 58 where it is mixed with an incoming radar pulse 60 from a radar antenna (not shown). The mixer 58 produces a (downconverted) pulse 62 which has the LO signal 48 subtracted from it. The pulse 62 is then passed to a receiver 64. The receiver 64 provides an output signal 66 which fed to an analogue-to-digital converter (ADC) 68, which provides a digital signal 70 for passing to a radar processor (not shown). A radar master clock and synchroniser 72 is connected to the ADC 68 to provide an ADC clock signal 74. The synchroniser 72 also provides a clock signal 76 for the drive circuit 44 which harmonically clocks the drive circuit 44 in relation to the ADC clock signal 74.

In operation, the upconverted pulse 56 is transmitted to a scene (not shown) by a transmitter (also not shown). A reflected or returned pulse (not shown) from an object (not shown) in the scene is received at the antenna (also not shown) and the pulse 60 from the antenna is downconverted in mixer 58 to provide pulse 62, pulse 62 being processed to provide the required range information of the object in the scene.

It will readily be understood that a fixed frequency transmit pulse 52 is combined with a phase shifted signal 48 derived from a MMIC phase shifter 42 which is driven by circuit 44 to predetermined phase profile, for example, a quadratic phase profile. Substantially the same signal 48 is used to deramp the received pulse. The resulting signal is then processed in the normal way. In the embodiment described with reference to FIG. 3, the phase shifter 42 is in the local oscillator path and hence the same phase shift is applied to transmitted and received signals.

As described above with reference to FIG. 3, a single MMIC phase shifter 42 is used for both upconversion and downconversion. It will be understood that separate phase shifters, and associated driving circuits, can be used for the upconversion and the downconversion. It is an essential feature of the invention that the MMIC phase shifters are clocked at a frequency directly harmonically related to the radar's analogue-to-digital converters. This is vital in order to avoid spurious beat frequencies which are difficult to control and which could damage the wanted radar signal.

The device of the present invention has the following advantages:
1. The implementation is totally digital and requires no setup or calibration.
2. The implementation is stable and requires no adjustment.
3. The circuitry required is extremely compact and low cost.
4. The technique may be easily retrofitted to a wide range of existing radars, providing a substantial improvement in performance at low cost.

Figure 4:
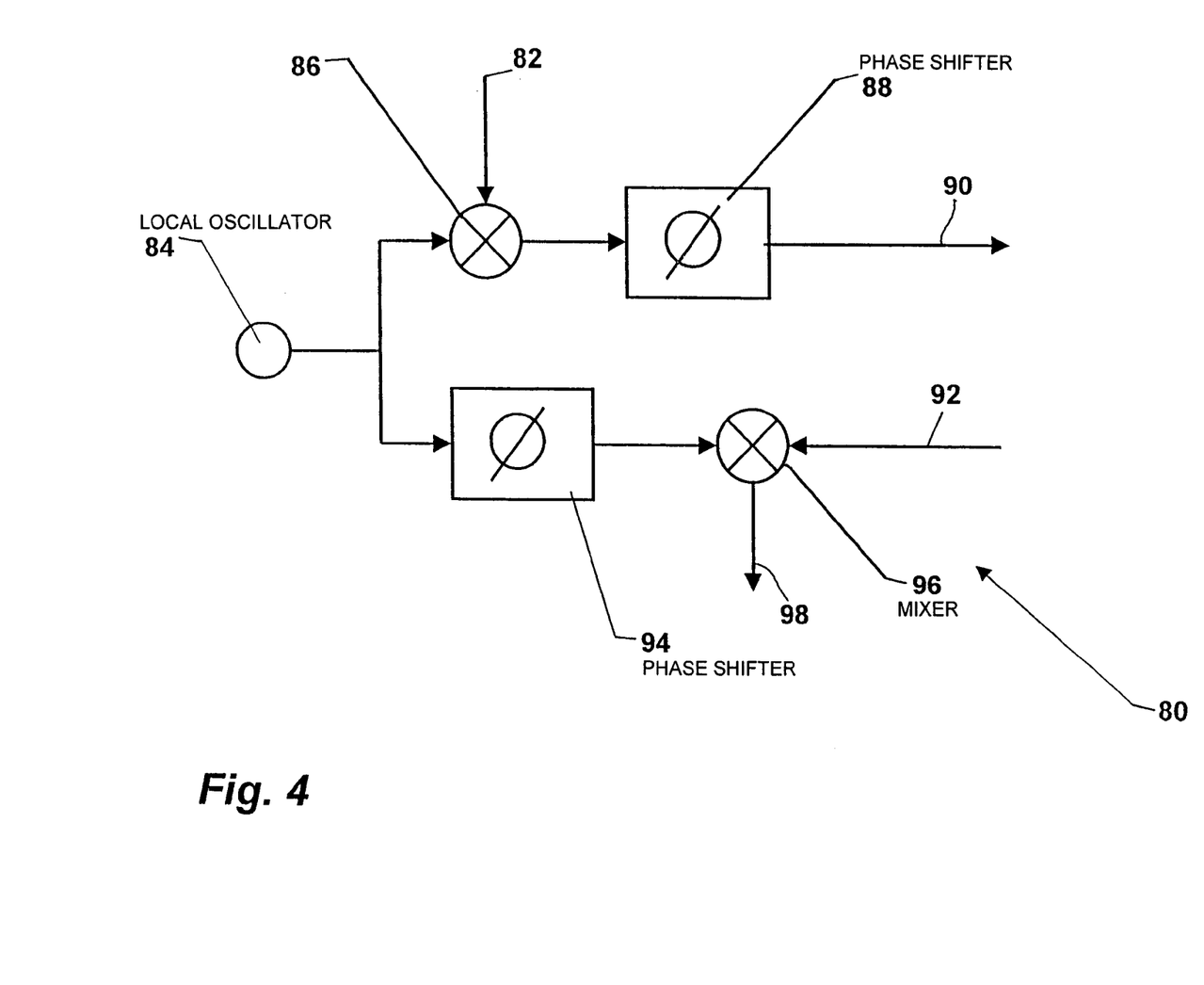
FIG. 4 illustrates a block diagram illustrating a first implementation of modulation of the radar pulse and the received radar pulse.
Figure 5:
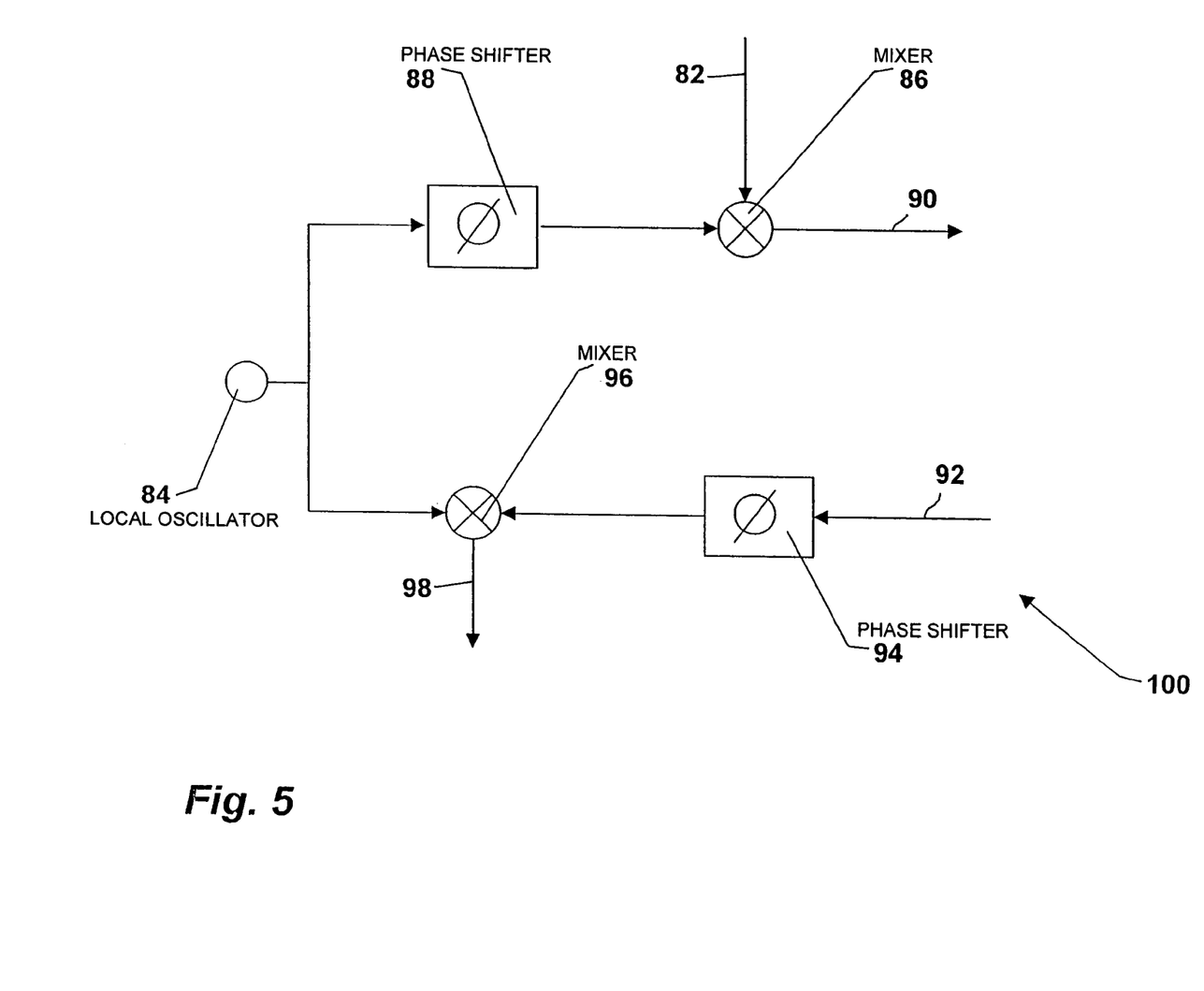
FIGS. 5 and 6 each illustrates a further implementation of modulation of the radar pulse and the received radar pulse.
Figure 6:
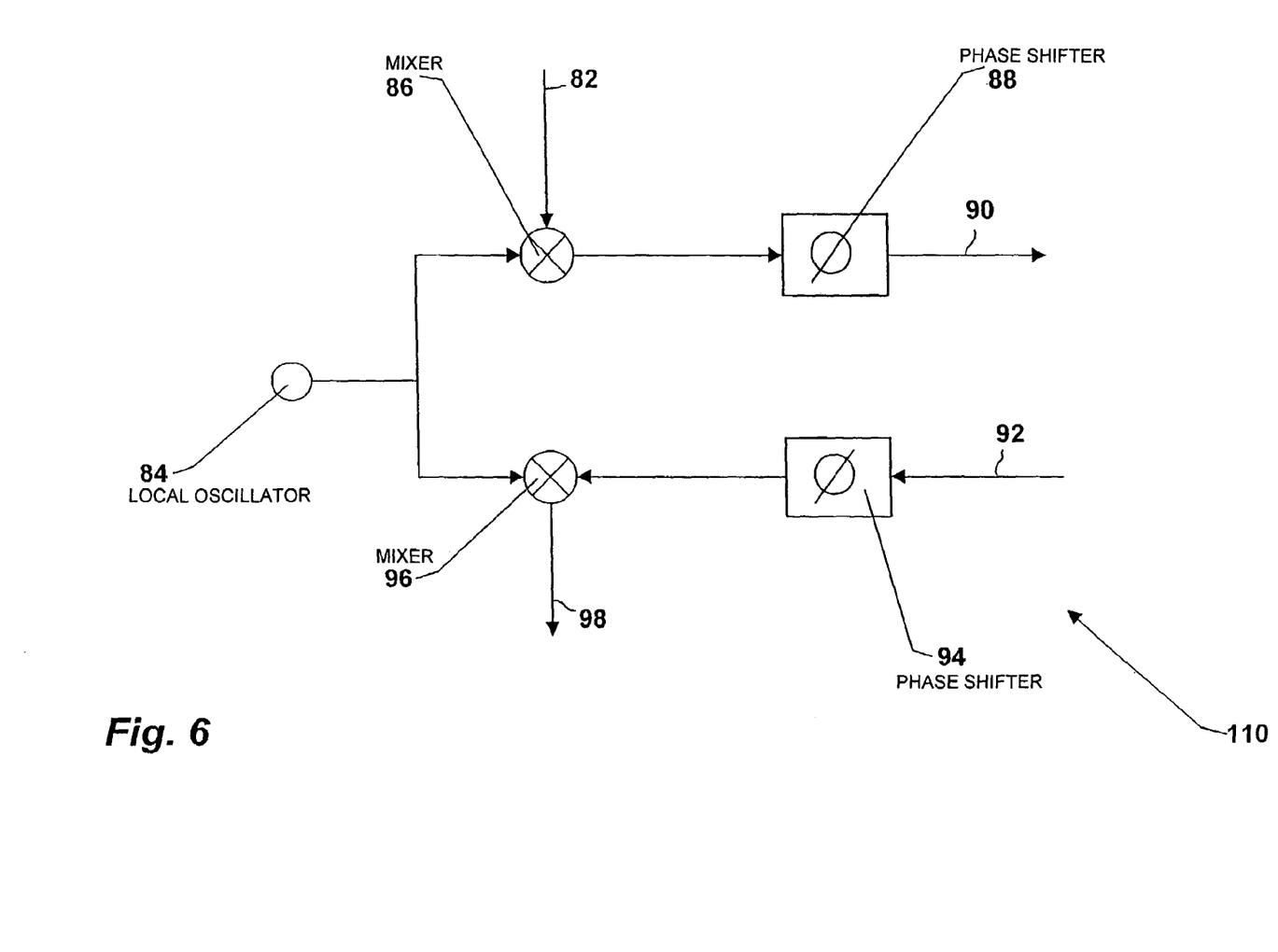

FIGS. 4 to 6 illustrate different implementations of the local oscillator signal and phase shifting for both transmission and receiving. Again, as before, in each implementation, the circuitry may be designed to accommodate either two phase shifters, one in each of the transmission and receiving paths, or a single phase shifter which operates in both the transmission and receiving paths, and will depend on the particular application.

In FIG. 4, a first alternative implementation is shown which is generally designated as 80. A radar pulse 82 is mixed with a local oscillator (LO) signal from LO 84 in mixer 86. The output from the mixer 86 is then passed to a phase shifter 88 prior to transmission as transmission signal 90. On receiving, signal 92 from an antenna (not shown) is mixed with a LO signal which has been phase shifted by phase shifter 94 in mixer 96 to provide a received signal 98 for further processing. In this implementation, both phase shifters 88 and 94 apply the same phase shift (e.g. both positive) to both the outgoing and incoming signals.

In a second alternative implementation as shown in FIG. 5 and designated 100, components which have been previously described in FIG. 4 are referenced alike. In this implementation, the radar pulse 82 is mixed with a phase shifted LO signal in mixer 86 to produce signal 90 for subsequent transmission. The signal 92 received from the antenna (not shown) is applied to the phase shifter 94 before being downconverted by mixing with the LO signal in mixer 96 to produce the received signal 98 for further processing (not shown). Here, as the phase shifter 94 is in the antenna path, a phase shift opposite to that applied to the LO signal in the transmission path. For example, phase shifter 88 applies a positive phase shift and phase shifter 94 applies a negative phase shift.

In a third alternative implementation as shown in FIG. 6 and designated 110, components which have been previously described in FIG. 4 are referenced alike. In this implementation, the radar pulse 82 is mixed with the LO signal in mixer 86 prior to passing to the phase shifter 88 to produce the transmission signal 90. On the incoming path, signal 92 received from the antenna (not shown) is applied to phase shifter 94 prior to being mixed with the LO signal in mixer 96 to produce the received signal 98 which is subsequently processed. As with the FIG. 5 implementation, the phase shifter 94 is in the antenna path and the phase shift applied is opposite to that of the phase shift applied by phase shifter 88 in the transmission path.

When it is stated that the applied phase shift is opposite, it is meant that the sign of the phase shift is opposite but the magnitude etc. of the phase shift is the same.

Although the present invention has been described above using digital phase shifters it will be appreciated that analogue phase shifters could also be used in accordance with a particular application. However, analogue phase shifters tend to be less stable than digital equivalents and produce less repeatable output signals than can be achieved with digital phase shifters.

In all the embodiments or implementations described above, it is important that the phase shifters be harmonically related to the analogue-to-digital clock signal applied to the received signal for subsequent processing as described with reference to FIG. 3 above.

The invention claimed is:

1. A method of obtaining high range resolution in a radar system, the method comprising the steps of:
   a) generating a radar pulse;
   b) modulating the radar pulse;
   c) transmitting the modulated radar pulse;
   d) receiving a radar pulse;
   e) modulating the received radar pulse; and
   f) processing the modulated radar pulse to obtain range information;
   characterized in that step b) comprises applying a time-dependent phase shift, changed at discrete time intervals, to the radar pulse at substantially the radar transmission frequency, and step e) comprises applying a time-dependent phase shift, changed at discrete time intervals, to the received radar pulse at substantially the radar transmission frequency;
   and in that step f) comprises sampling the received signal at discrete time intervals which are an integral number of the time intervals of the time-dependent phase shift.

2. A method according to claim 1, wherein the time-dependent phase shift comprises a synthesized sequence.

3. A method according to claim 1, wherein the time-dependent phase shift comprises an arbitrary sequence.

4. A method according to claim 1, wherein the time-dependent phase shift produces a predetermined phase profile.

5. A method according to claim 4, wherein the predetermined phase profile comprises a quadratic phase profile.

6. A radar system comprising:
   means for generating a radar pulse;
   means for modulating the radar pulse;

means for transmitting the radar pulse;
means for receiving a reflected radar pulse;
means for modulating the received radar pulse; and
means for processing the modulated received radar pulse to obtain range information;
characterized in that the means for modulating the radar pulse includes a phase shifter which applies a time-dependent phase shift, which is changed at discrete time intervals, at substantially the radar transmission frequency, and the means for modulating the received radar pulse includes a phase shifter which applies a time-dependent phase shift, which is changed at discrete intervals, at substantially the radar transmission frequency;
and in that the means for processing the modulated received radar pulse includes sampling means for sampling the received signal at discrete time intervals which are an integral number of the time intervals of the time-dependent phase shift.

7. A system according to claim 6, wherein each phase shifter is driven in accordance with a synthesized sequence.

8. A system according to claim 7, wherein the synthesized sequence is implemented by a plurality of discrete logic components.

9. A system according to claim 7, wherein the synthesized sequence is implemented by a field programmable gate array.

10. A system according to claim 6, wherein each phase shifter is driven in accordance with an arbitrary sequence which is provided by a memory device.

11. A system according to claim 6, wherein the means for modulating the radar pulse includes a local oscillator and first mixing means, the local oscillator providing a signal for mixing with the radar pulse in the first mixing means.

12. A system according to claim 11, wherein the local oscillator signal is phase shifted prior to mixing with the radar pulse.

13. A system according to claim 11, wherein the local oscillator signal is mixed with the radar pulse prior to being phase shifted.

14. A system according to claim 11, wherein the means for modulating the received radar pulse includes a local oscillator and second mixing means, the local oscillator providing a signal for mixing with the received radar pulse in the second mixing means.

15. A system according to claim 14, wherein the local oscillator signal is phase shifted prior to mixing with the received radar pulse.

16. A system according to claim 14, wherein the received radar pulse is phase shifted prior to mixing with the local oscillator signal.

17. A system according to claim 11, wherein a single local oscillator is utilized which provides a local oscillator signal to both the radar pulse and the received radar pulse.

18. A system according to claim 17, wherein a single phase shifter is utilized for both modulation of the radar pulse and modulation of the received radar pulse.

19. A system according to claim 6 wherein each phase shifter comprises a digital phase shifter.

20. A system according to claim 19, wherein the digital phase shifter comprises a monolithic microwave integrated circuit.

* * * * *